Patented May 5, 1925.

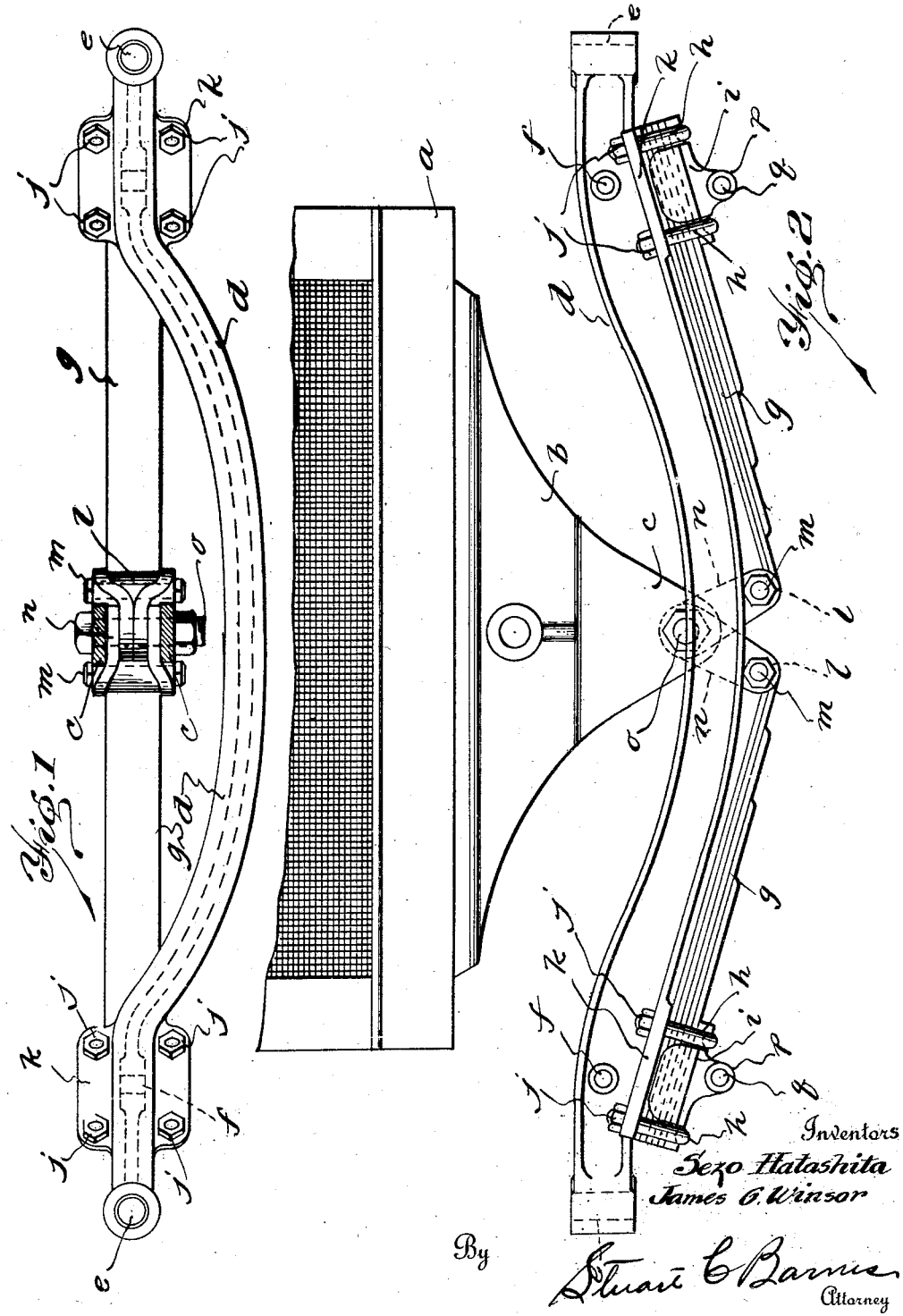

1,536,994

UNITED STATES PATENT OFFICE.

JAMES G. WINSOR, OF DETROIT, AND SEZO HATASHITA, OF ANN ARBOR, MICHIGAN.

VEHICLE SPRING.

Application filed June 30, 1923. Serial No. 648,645.

*To all whom it may concern:*

Be it known that we, JAMES G. WINSOR, a citizen of the United States, residing at Detroit, in the county of Wayne and State of Michigan, and SEZO HATASHITA, a subject of the Emperor of Japan, residing at Ann Arbor, in the county of Washtenaw and State of Michigan, have invented certain new and useful Improvements in a Vehicle Spring, of which the following is a specification.

This invention relates to vehicle springs and more particularly to one for supporting the front axle of a Fordson tractor.

It has not been customary to mount a tractor on springs because of the intensive stresses, but to secure the chassis directly onto the axle. The object of our invention is to provide a spring suspension that has not only sufficient strength to withstand the stresses, but has the elasticity to absorb the shocks. Another object is to mount our springs on the tractor without changing any chassis design, thereby our device may be installed quickly and efficiently with very little labor and cost.

In the drawings:

Fig. 1 is a plan view of our axle and spring construction.

Fig. 2 is a front elevation of our construction attached to a tractor chassis.

The chassis frame $a$ of a tractor has the usual Fordson bracket $b$ suspended therefrom provided with a yoke portion $c$, and our new spring axle construction is adapted to be pivotally supported within this yoke portion. Our construction consists of an axle $d$ which is curved outwardly and downwardly as shown in the drawing, in order to clear the bracket $b$, and is provided at the outer ends with the holes $e$ in which the spindles of the steering knuckles are rotatably secured. Holes $f$ are drilled through the web of the axle in which the radius rods may be secured.

A pair of inwardly extending cantilever leaf springs $g$ are each anchored at one end to the outer end of the axle just inside of where the steering knuckles are rotatably secured. U-bolts $h$ and nuts $j$ clamp the leaves tightly between the bearing plate $i$ and the inclined bearing portion $k$ carried by the axle. Each spring is inclined downwardly and the end thereof formed into a knuckle eye $l$ for receiving the shackle bolt $m$. A pair of shackles $n$ connect each spring to the supporting bracket $b$ and a shackle bolt $o$ pivotally secures both pairs of shackles to said bracket.

The lower bearing plate $i$ is provided with a boss portion $p$ through which a hole $q$ is drilled. This hole is arranged to receive the radius rod when wheels of a larger diameter are used.

In our invention we replace the usual rigid axle with our special form of axle carrying the aforesaid described cantilever springs. Springs of this character which are relatively short in length have great stress, resisting power together with sufficient elasticity.

We have shown our preferred form of axle and spring construction as used when wheels of greater diameter than the standard wheels are used. In using standard wheels which are of less diameter it is essential to keep the chassis at prescribed elevation and to maintain this elevation with our axle construction it is necessary to provide longer shackles in place of the shackles $n$ as shown in the drawing. This results in maintaining the chassis frame at a constant elevation.

What we claim is:

1. In a vehicle spring suspension, the combination of a chassis frame provided at the front with a supporting bracket depending below the centers of the front wheels, an axle having its central portion bowed outwardly, a pair of spring members anchored to the under side of the axle near the ends thereof and extending inwardly substantially perpendicular to the axis of the chassis frame and below the level of the axle, and means for connecting the inner end of each spring member to the depending bracket carried by the chassis frame in the space made by the bowing of the axle.

2. In a vehicle spring suspension, the combination of a chassis frame provided with a bracket depending to substantially the wheel centers level, an axle having its central portion bowed downwardly and outwardly, a pair of spring members anchored to the under side of the axle near the ends thereof and extending inwardly substantially perpendicular to the axis of the chassis frame, and means for connecting the inner end of each spring member to the depending bracket carried by said chassis frame in the space made by the bowing of the axle and below the level of the axle.

3. In a vehicle spring suspension, the combination of a chassis frame provided with a depending bracket centrally located with respect to the chassis frame and depending below the level of the outer end of the axle, a shackle bolt carried by the depending bracket, an axle, arranged at its center to provide clearance at the level of the outer ends of the axle, a pair of inwardly extending cantilever spring members anchored to the under side of the axle near the ends thereof, the entire length of said springs located below the level of the axle, and a pair of shackles connecting the inner end of each cantilever spring with said shackle bolt carried by the depending bracket.

4. In a vehicle spring suspension, the combination of a chassis frame, an axle arranged at its center to provide clearance below the level of the outer ends and provided with a bearing surface on its under side near each end, a pair of inwardly extending cantilever springs positioned below the level of the axle along its entire length, each having one end engaging with said bearing surface and the other end secured to the chassis frame, a bearing plate arranged to engage the under side of the spring member, and means for clamping the bearing plate and spring member against the bearing surface carried by the axle.

5. In a vehicle spring suspension, the combination of a chassis frame, an axle provided with a bearing surface on its under side near each end, a pair of inwardly extending spring members each having one end engaging with said bearing surface and the other end secured to the chassis frame, a bearing plate and means for clamping the bearing plate and spring member against the bearing surface carried by the axle, said bearing plate having a hole for fastening radius rods thereto.

6. In a vehicle spring suspension, the combination of a chassis frame, an axle provided with a hole near each end for fastening radius rods thereto, a pair of spring members, a bearing plate and means for clamping the bearing plate and one end of each spring member to the under side of the axle near the end thereof, and the said bearing plate provided with a hole for fastening radius rods thereto when using wheels of a greater size.

7. In a vehicle spring suspension, the combination of a chassis frame, a radiator supported thereon, a depending bracket secured to the chassis frame under the radiator provided with a yoke portion, an axle having its central portion bowed downwardly and outwardly, a pair of spring members anchored to the under side of the axle near the ends thereof and extending inwardly substantially perpendicular to the axis of the chassis frame and below the level of the axle, and means for connecting the inner end of each spring member to the yoke portion carried by said depending bracket in the space made by the bowing of the axle.

In testimony whereof they affix their signatures.

JAMES G. WINSOR.
SEZO HATASHITA.